No. 611,999. Patented Oct. 4, 1898.
W. S. HUSTON.
MANGER GUARD.
(Application filed May 19, 1897. Renewed Apr. 2, 1898.)
(No Model.)
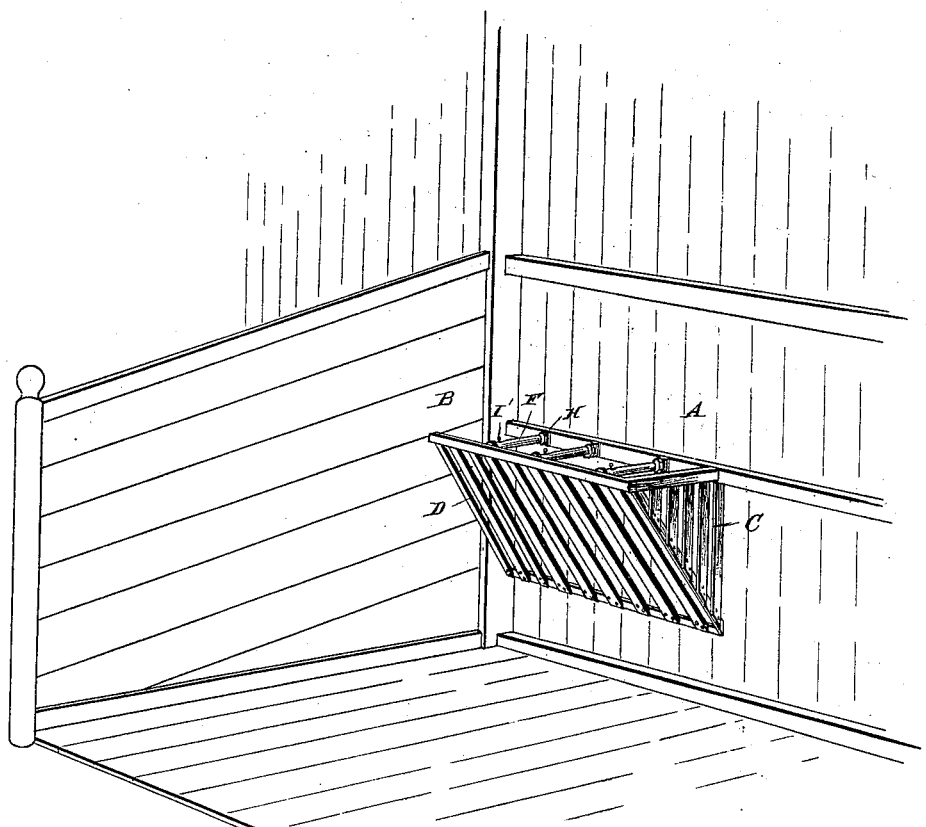
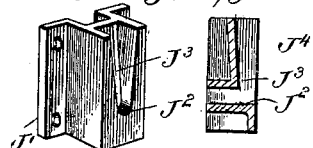
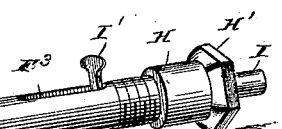
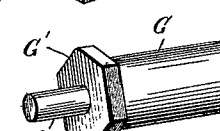
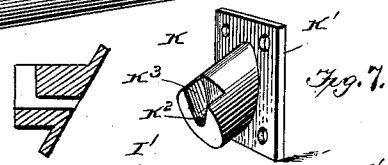
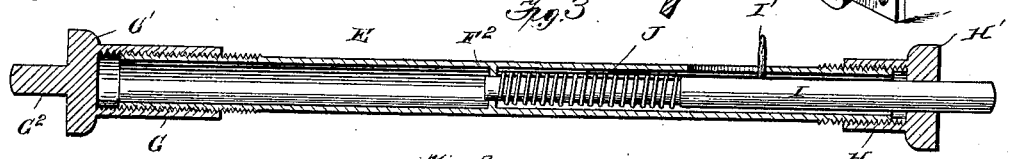
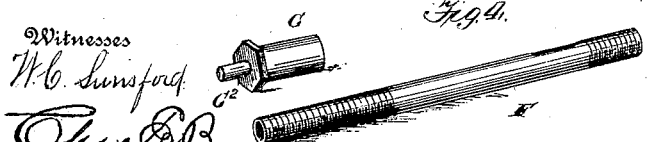

UNITED STATES PATENT OFFICE.

WAYMAN S. HUSTON, OF BLANDINSVILLE, ILLINOIS, ASSIGNOR OF ONE-HALF TO WILLIAM T. HARDESTY, OF SAME PLACE.

MANGER-GUARD.

SPECIFICATION forming part of Letters Patent No. 611,999, dated October 4, 1898.

Application filed May 19, 1897. Renewed April 2, 1898. Serial No. 676,252. (No model.)

*To all whom it may concern:*

Be it known that I, WAYMAN S. HUSTON, residing at Blandinsville, in the county of McDonough and State of Illinois, have invented a new and useful Manger-Guard, of which the following is a specification.

My invention relates to mangers for containing hay, fodder, or other long feed for horses and cattle and is in the nature of a new and improved construction of guard for the same.

The object of my invention is to form a guard for the tops of mangers which will prevent horses or cattle from wasting the hay or other long feed contained therein.

A further object is to so construct a manger-guard that it can be readily and easily placed in position when the manger is filled with hay or fodder and as readily removed when the manger is empty to permit of the refilling of the same.

With these objects in view my invention consists in a manger-guard provided with means whereby it may be readily placed in and removed from position and in other improved constructions, arrangements, and combinations of parts hereinafter fully described, and afterward specifically pointed out in the claims.

I have clearly illustrated my invention in the accompanying drawings, in which—

Figure 1 is a perspective view showing a manger in position in the barn or stable with my improved guard in position on the manger ready for practical use. Fig. 2 is a perspective view of one member of my improved guard detached from the manger. Fig. 3 is a central longitudinal sectional view of the same. Fig. 4 is a detail perspective view showing the different parts comprising a member detached from each other. Fig. 5 is a detail perspective view of one of the attaching-brackets, being the one attached to the wall. Fig. 6 is a central vertical section through the same from front to rear. Fig. 7 is a detail perspective view showing the attaching-bracket at the other end of the guard to be attached to the inside of the front wall of the manger, and Fig. 8 is a central vertical section through the bracket shown in Fig. 7 in the position it assumes when in place for use.

Like letters of reference mark the same parts wherever they occur in the various figures of the drawings.

In the accompanying drawings, A is the wall of a stable or barn to which the manger is to be attached, and B is the side wall or partition of a stall therein, which in this instance serves as one end wall of the manger. Should the manger be long enough to reach entirely across a stall, then the next adjacent partition would form the other end wall. As illustrated, however, an end wall C is shown in the form of an inverted right-angle triangle composed of slatwork, attached on its perpendicular side to the wall A, its base being on top and its hypotenuse forming its inwardly-inclined front.

D is the front of the manger, connected to the front or inclined edge or side of the end wall C in any suitable manner, either permanently by nails or screws, or it might be pivotally attached at the bottom and have suitable locking devices at the top to hold it rigid in its closed position.

The manger thus described may be varied in details of construction to suit the fancy of the owner; but that shown is well adapted to receive my improved guard.

E is one of the members of my guard, of which there may be as many as may be preferred, according to the length of the manger. They are duplicates in construction, and the illustration and description in detail of one of them will serve for all.

Each member is provided with a body-piece F, consisting of a section of pipe provided with an exterior screw-thread F' at each end and having a centrally bored or perforated diaphragm $F^2$ at about its mid-length. On each end of the body F is threaded a cap-piece, (marked G and H,) the cap-piece G being provided with a radiating flange G' and a fixed pintle or bolt $G^2$, projecting centrally therefrom in line with the length of the body F. The cap H has a similar flange H', and instead of a rigid pintle or bolt it is centrally bored or perforated to receive a bolt I, which projects from the end in line with the body, passes through the perforation, a part way through the body F, and through the diaphragm $F^2$. This bolt has a stem or handpiece I' secured in one side, which is inserted therein through a slot F³ in the body F and limits the sliding of the bolt longitudinally in the body. The inner end of the bolt I is slightly reduced in diameter, and on this portion is coiled a spiral spring J, which bears at its inner end against the diaphragm F² of body F and at its outer end against the shoulder formed at the junction of the two different thicknesses of the bolt I, thus always tending to push the bolt I to its outer position, as shown in Figs. 2 and 3.

On the inside of the front wall D of the manger are placed a number of brackets corresponding to the number of guard members to be used, one of such brackets being illustrated in Figs. 5 and 6. These brackets may be solid or hollow and are marked J. Each bracket has flanges J', through which pass the nails or screws to secure it in position, a hole J' to receive the bolt I, and an inclined notch or groove J³, leading from the top to said bore J² to properly guide the end of the bolt into the bore. The corresponding bracket K is secured to the inside of the upper edge of the front D of the manger. It is similar in construction to bracket J, except that its body, containing the bore K² to receive the front pintle, and the inclined groove K³ to guide the pintle into the bore are at a different angle to the flanges K', so as to bring the bore K² on a horizontal line when the flanges K' are secured to the inclined front of the manger.

Each guard member is inserted in place by first placing the rigid end pintle into the bore K² and sliding it down groove K³ to insure its entry into the bore and facilitating its use without a light, then bringing the other end down until the spring-bolt enters the inclined groove J³, guiding it to the bore J², and pushing in the bolt I until the bore is reached, when the bolt will snap into position therein.

To remove a guard member, it is only necessary to withdraw the bolt from the bore J² by means of handpiece I' and lift it out of bore K², when it will be free to be laid away or otherwise disposed of.

When a manger with an open top is filled with hay, fodder, or other long food, it is well known that the horses or cattle in eating the same waste a large proportion thereof by grasping more than they can get into their mouths and dropping the surplus upon the floor to be trampled upon and spoiled. It is to obviate this difficulty and prevent this waste of feed that my invention has been produced. The guard members hereinbefore described will be placed as close together as the judgment of the owner may dictate, limited by the size of the head of the animal and the kind of long food to be used. When the guards are in place, the horse or other animal will thrust his head down between two of the members, and when he has taken up a portion of the food contained in the manger and raises his head all surplus loose hay or long food will be prevented from passing out of the manger by striking against the guard members on each side.

My improved manger-guard is simple and cheap to construct, and it will pay for itself in the saving of long food in a very short time.

Having thus fully described my invention, what I claim as new, and desire to secure by Letters Patent, is—

1. The combination with a manger of a pair of brackets secured opposite each other on the inside of its front and rear walls, each bracket being provided with a horizontal socket and an inclined groove leading thereto, of a cross-bar or guard member provided at one end with a rigid pintle or bolt to enter one of said sockets, and at the other end with a spring-bolt to enter the other of said sockets, substantially as described.

2. The combination with a manger provided with a vertical rear wall and an inclined front wall of a pair of brackets secured to said walls opposite each other and provided with horizontal sockets and inclined grooves leading to said sockets, of a cross-bar or guard member consisting of a pipe-section threaded at each end, a head-piece threaded on one end of said pipe-section and provided with a rigid pintle to enter one of said sockets and a sliding bolt normally held in position projecting beyond the other end of the pipe-section by spring-pressure, substantially as described.

3. The guard member for a manger-guard herein described consisting of the main body of pipe having an exterior thread at each end, a centrally-located perforated diaphragm, and a longitudinal slot in one side in combination with an end piece threaded on one end thereof and provided with a radiating flange and rigid pintle, a head-piece threaded on the opposite end of the body and provided with a perforated flange, and a spring-bolt projecting from the latter end of the tubular body and having a handpiece projecting from the slot thereof, all substantially as set forth.

WAYMAN S. HUSTON.

Witnesses:
W. T. HARDESTY,
W. W. HARDISTY.